Patented Sept. 15, 1925.

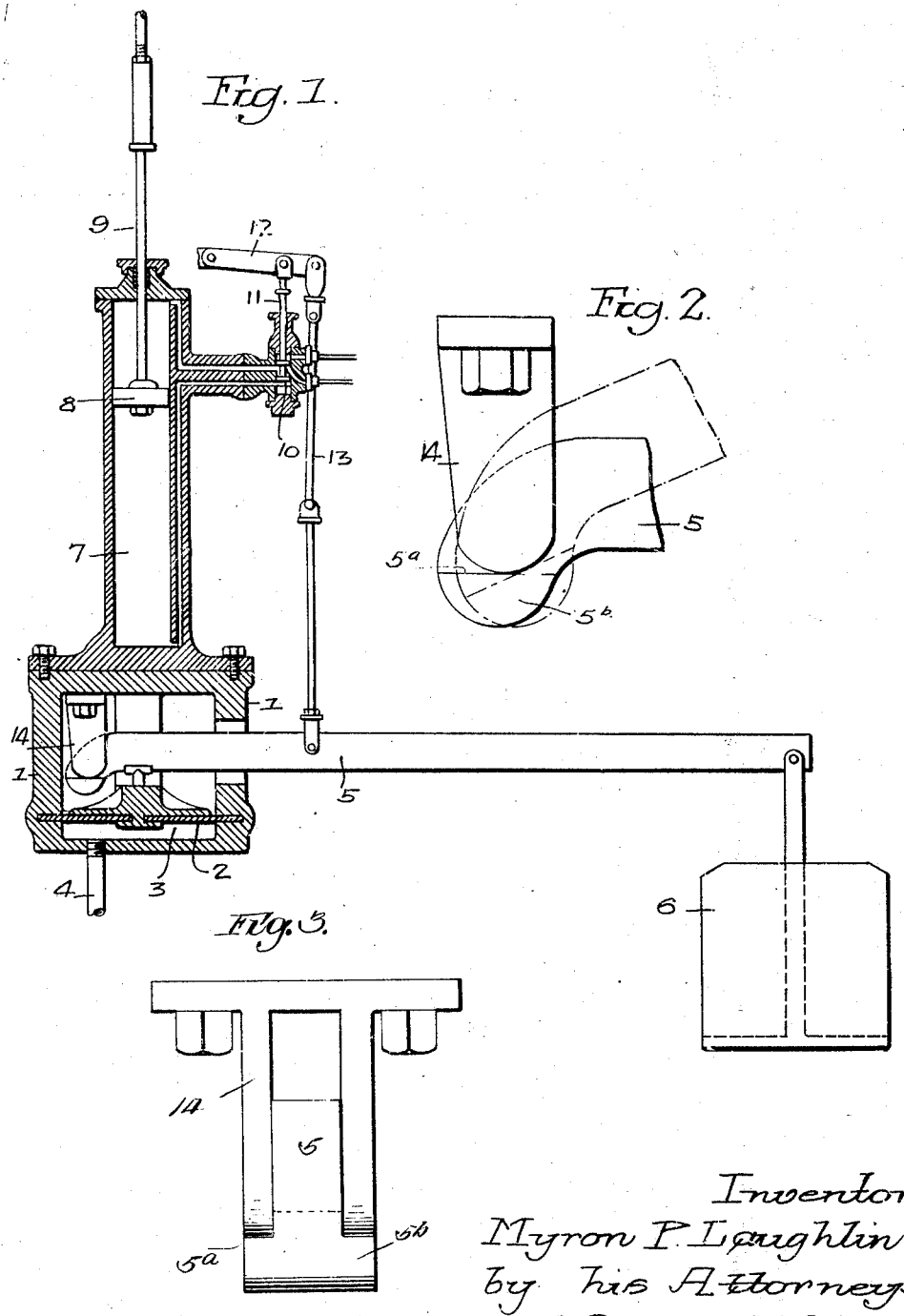

1,553,946

UNITED STATES PATENT OFFICE.

MYRON P. LAUGHLIN, OF PHILADELPHIA, PENNSYLVANIA, ASSIGNOR TO AMERICAN ENGINEERING COMPANY, OF PHILADELPHIA, PENNSYLVANIA, A CORPORATION OF PENNSYLVANIA.

PRESSURE REGULATOR.

Application filed October 14, 1920. Serial No. 416,842.

*To all whom it may concern:*

Be it known that I, MYRON P. LAUGHLIN, a citizen of the United States, residing in Philadelphia, Pennsylvania, have invented Pressure Regulators (Case B), of which the following is a specification.

One object of this invention is to provide a pressure regulating device so constructed that an upward movement of the regulator diaphragm will be opposed by an increasing force until a point of equilibrium is attained, whereupon the diaphragm with its associated parts will come to rest in a definite position until further change occurs in the pressure. Similarly a lowering of the pressure applied to the diaphragm such as would permit it to move downwardly will cause a decrease in the force acting on said diaphragm until it with its associated parts again comes to rest in a second definite position; the invention further contemplating a relatively simple, substantial and reliable device for actuating the valves, dampers, electric controllers or the like, either directly or indirectly and which shall at all times give a movement in direct proportion to the variation of the controlled pressure.

These objects and other advantageous ends I attain as hereinafter set forth, reference being had to the accompanying drawings, in which, Fig. 1 is a side elevation, partly in section and to some extent diagrammatic, illustrating my invention as applied to a pressure regulating device;

Fig. 2 is an enlarged fragmentary elevation illustrating the operation of the mechanism; and Fig. 3 is a side elevational view of the structure of Fig. 2.

In the above drawings, 1 represents a casing across which extends a diaphragm 2 in such position as to provide a closed chamber 3 having an inlet conduit 4 connected to the source of the pressure to be controlled. Also within the casing is fulcrumed a main lever 5 bearing upon the diaphragm 2 and carrying at its outer or free end a weight 6.

Mounted on the casing is a cylinder 7 having within it a piston 8 which through a rod 9 is designed to operate any desired pressure controlling or governing element such as a damper, valve, electric controller, etc. The admission and exhaust of fluid for the cylinder 7 is controlled by a valve 10 which through a rod 11, lever 12 and a link 13 is operated from the main lever 5.

In accordance with my invention I so construct the fulcrum structure 14 and the cooperating portion of the lever 5 that the effective distance between said structure and the point of engagement of the lever 5 with the diaphragm 2 will be automatically altered as said lever changes its position under the action of said diaphragm. For this purpose the fulcrum structure 14 is preferably made forked and has the lower edges or ends of its branches curved to cooperate with the flat upper surfaces $5^a$ of two laterally extended bearing portions $5^b$ of the lever 5.

As a consequence of this construction, when said lever rises or falls under the action of the diaphragm 2, its bearing surface rocks on the curved end fulcrum member and the point of engagement of the latter with the lever is shifted nearer to or farther from the point of engagement of the lever with the diaphragm. As a consequence, there is an increase or decrease in the ratio of the two moment arms of the lever. For a rise of the latter the effective lengths of both of these moment arms are decreased but not in the same proportion, and likewise for a fall of the lever, the effective lengths of said arms are increased, but again not in the same proportion.

Any rise of the diaphragm 2 will therefore meet with a cumulative opposition to its upward movement and for a small change in the controlled pressure, a small movement of the lever with its associated parts will result,—a larger movement being similarly obtained for a larger change in said pressure. In any case the position of the diaphragm will always be the same for a given controlled pressure. When the diaphragm falls, a slight downward movement will so decrease the opposition to the upward movement exerted by the fluid in the chamber 3, that a state of equilibrium results with the parts in definite positions proportional to the controlled pressure.

I claim:—

1. In a pressure regulator, the combination with a longitudinally extending fluid actuated member, of a lever operated thereby and provided with a laterally extending bearing portion, and a fulcrum having a curved surface for coaction with said bearing portion, whereby the effective lengths of the lever moment arms may be changed as the lever is moved under the action of said member.

2. In a pressure regulator, the combination with a diaphragm, of a supporting structure including a fulcrum piece having spaced curved bearing surfaces, and a weighted lever operatively engaged by the diaphragm and formed with spaced bearing portions having flat faces positioned to roll on said curved fulcrum surfaces, respectively, as the diaphragm rises or falls, whereby the distance between the points of engagement of the lever with the diaphragm and with the fulcrum piece may be varied.

3. In a pressure regulator, the combination with a diaphragm and supporting structure therefor, of a fulcrum structure comprising spaced end portions provided with curved surfaces, and a control lever operatively associated with said diaphragm and extending intermediate said spaced end portions, said lever having flat surfaces so positioned as to roll on said curved surfaces, respectively, whereby the moment arms of said lever may be varied.

MYRON P. LAUGHLIN.